(12) United States Patent
Jarske

(10) Patent No.: US 9,811,212 B2
(45) Date of Patent: Nov. 7, 2017

(54) ULTRASOUND SENSING OF PROXIMITY AND TOUCH

(71) Applicant: Microsoft Technology Licensing, LLC, Redmond, WA (US)

(72) Inventor: Petri Jarske, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/630,836

(22) Filed: Feb. 25, 2015

(65) Prior Publication Data
US 2016/0246449 A1    Aug. 25, 2016

(51) Int. Cl.
G06F 3/043    (2006.01)
B06B 1/06    (2006.01)
G06F 3/041    (2006.01)

(52) U.S. Cl.
CPC .......... *G06F 3/0436* (2013.01); *B06B 1/0644* (2013.01); *G06F 3/0416* (2013.01); *G06F 3/0433* (2013.01); *G06F 2203/04101* (2013.01); *G06F 2203/04108* (2013.01)

(58) Field of Classification Search
CPC ...... G06G 3/043; G06F 3/0433; G06F 3/0436
See application file for complete search history.

(56) References Cited

U.S. PATENT DOCUMENTS

| | | | |
|---|---|---|---|
| 5,717,434 A | 2/1998 | Toda | |
| 6,313,825 B1 | 11/2001 | Gilbert | |
| 6,441,809 B2 | 8/2002 | Kent et al. | |
| 8,401,513 B2 | 3/2013 | Langereis et al. | |
| 2011/0025635 A1 | 2/2011 | Lee | |
| 2011/0193818 A1 | 8/2011 | Chen et al. | |
| 2012/0182269 A1 | 7/2012 | Kent et al. | |
| 2012/0194483 A1 | 8/2012 | Deluca | |
| 2012/0206417 A1 | 8/2012 | Lee | |
| 2012/0274610 A1 | 11/2012 | Dahl | |
| 2013/0093732 A1 | 4/2013 | Esteve et al. | |

(Continued)

FOREIGN PATENT DOCUMENTS

| | | |
|---|---|---|
| EP | 0675600 A1 | 10/1995 |
| EP | 2595038 A2 | 5/2013 |
| WO | 2014018119 A1 | 1/2014 |

OTHER PUBLICATIONS

"International Search Report and Written Opinion Issued in PCT Application No. PCT/US2016/016253", Mailed Date: Apr. 15, 2016, 14 Pages.

(Continued)

*Primary Examiner* — Adam R Giesy

(57) ABSTRACT

Ultrasound is used to detect the proximity of an object and whether the object touches a body of an electronic device. A transducer may produce ultrasonic waves to air and to the device body simultaneously. The transducer is connected to the body, allowing a vibration of the ultrasonic waves to travel in the body. The vibration characteristics, for example the decay, change in the body when the body is touched. The decay may be analyzed to detect the touch. The transducer produces the ultrasonic waves to the airspace in proximity to the electronic device. Waves returning from the airspace, for example, after reflecting back from a proximate object, are analyzed and proximity or a gesture of the object may be detected.

20 Claims, 4 Drawing Sheets

(56) References Cited

U.S. PATENT DOCUMENTS

2013/0127783 A1\* 5/2013 Lee .................. G06F 3/043
  345/175
2014/0055406 A1   2/2014 Hong et al.
2015/0199030 A1\* 7/2015 Mikkola ............. G06F 3/0489
  345/157
2016/0026340 A1\* 1/2016 Dahl .................. G06F 3/011
  345/177

OTHER PUBLICATIONS

Liu, et al., "SoundSense: 3D Gesture Sensing using Ultrasound on Mobile Devices", Dec. 9, 2014 Available at: http://mrorz.github.io/files/soundsense.pdf.
Klee, et al., "Piezoelectric Thin Film Platform for Ultrasound Transducer Arrays", In Proceedings of IEEE International Ultrasonics Symposium, Oct. 18, 2011, 4 pages.
https://www.youtube.com/watch?v=mm7DzslrA1o &feature=youtu.be, Mar. 26, 2010.
"Second Written Opinion Issued in PCT Application No. PCT/US2016/016253", Mailed Date: Jan. 20, 2017, 9 Pages.

\* cited by examiner

Fig. 4
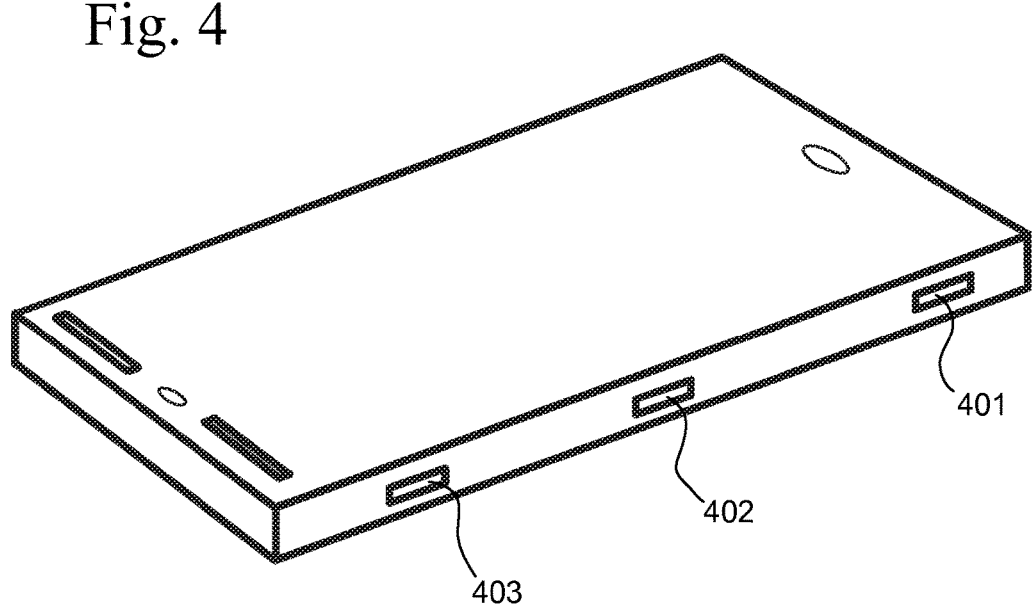
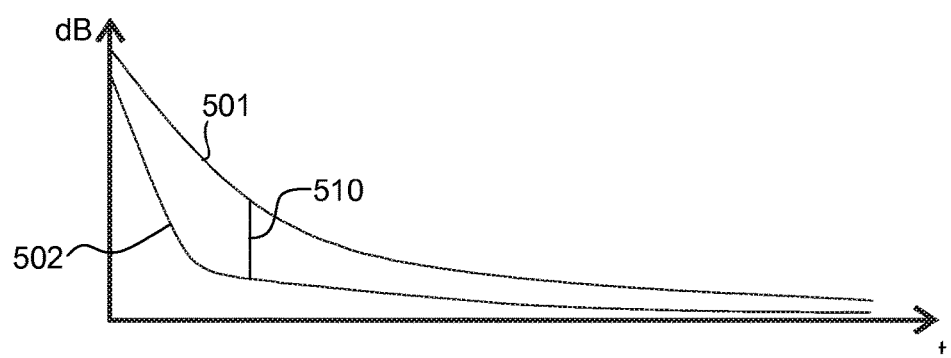
Fig. 5

ULTRASOUND SENSING OF PROXIMITY AND TOUCH

BACKGROUND

Hand-held devices, such as mobile phones, use capacitive sensors to detect physical phenomena such as the proximity, touch or touch gesture of the user, where the sensors can detect when the user is either holding or close to the device. Capacitive sensors are effective with insulant device body or device housing materials such as plastic. However, many hand-held devices use conductive material such as metals for the body or housing material, which can block the capacitance and specific arrangements that may be needed to enable the use of capacitive sensors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Ultrasound is used to detect the proximity of an object and whether the object touches a body of an electronic device. A transducer may produce ultrasonic waves to air and to the device body simultaneously. The transducer is connected to the body, allowing the ultrasonic waves to produce a vibration in the body. The vibration characteristics, for example the decay, change when the body is touched. The decay may be analyzed to detect the touch. The transducer produces ultrasonic waves to the airspace in proximity to the electronic device. The ultrasonic waves returning from the airspace, for example, after reflecting back from a proximate object, are analyzed and the proximity or a gesture of the object may be detected.

Many of the attendant features will be more readily appreciated as they become better understood by reference to the following detailed description considered in connection with the accompanying drawings. The embodiments described below are not limited to implementations which solve any or all of the disadvantages of known hand-held devices.

DESCRIPTION OF THE DRAWINGS

The present description will be better understood from the following detailed description read in light of the accompanying drawings, wherein:

FIG. 4 is an example of the electronic device, wherein the electronic device comprises multiple touch sensitive areas;

FIG. 5 is an example of a graph illustrating the sound wave energy from a receiving transducer as a function of time;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a mobile phone, the device described is provided as an example and not a limitation. As those skilled in the art will appreciate, the present examples are suitable for application in a variety of different types of mobile and/or hand-held apparatuses, e.g. in tablets, laptops or gaming consoles.

Figure 1:
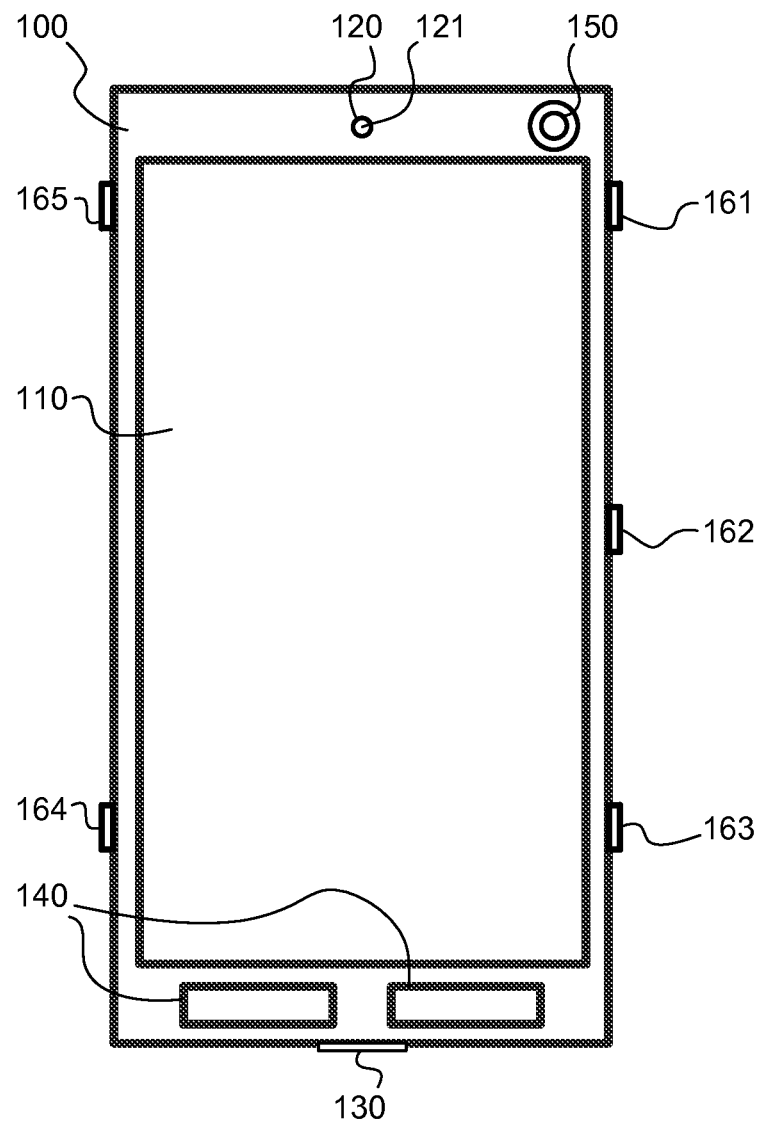
FIG. 1 is a schematic diagram of one example of an electronic device with touch and proximity sensing elements.

FIG. 1 shows one example of an electronic device with touch and proximity sensing elements, wherein one embodiment of the electronic device is a mobile phone. The electronic device comprises a body 100, wherein a portion of the body is covered with a housing. The electronic device also comprises a display 110, a speaker 121, a microphone 130 and keys 140. The speaker 121 is inside the electronic device and the housing comprises an opening 120, wherein the speaker sound exits the electronic device. An ultrasound wave may also exit from the same opening 120 as the speaker sound. The electronic device may also comprise other features such as a camera 150. The electronic device may comprise a second set of keys 161, 162, 163, 164, 165 configured around the body 100, wherein the keys 140 comprise push buttons and the second set of keys 161, 162, 163, 164, 165 comprise a touch sensing function. The electronic device may comprise other key and/or button configurations with different functions for detecting touching or pushing. The placement of key and button configuration is presented as an example, wherein the number of buttons and keys may vary. Key and/or button configuration may comprise mechanical buttons, buttons with capacitive sensing or buttons configured to the display with sensing function.

Figure 2:
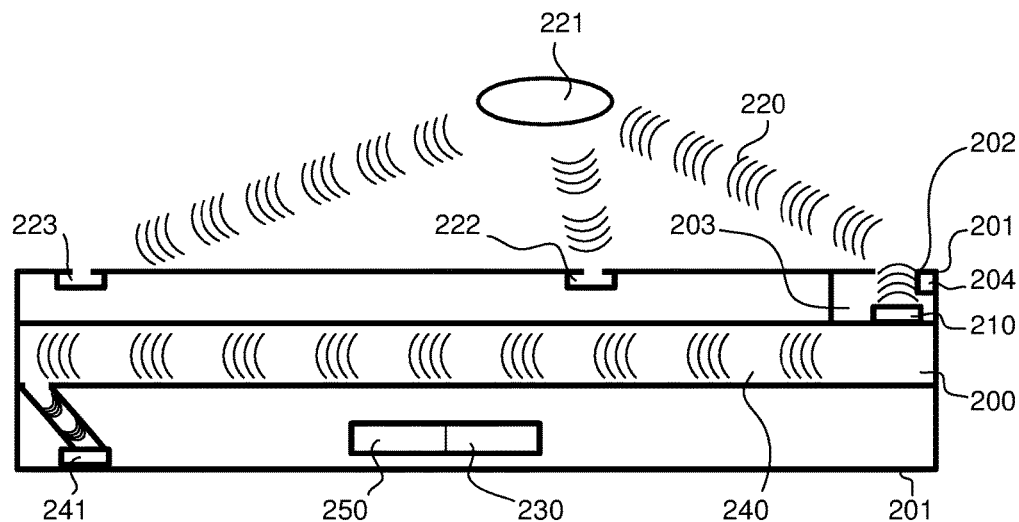
FIG. 2 is a schematic cross-section of one example of an electronic device with an ultrasonic transducer, wherein a transducer is positioned inside a housing or body.

FIG. 2 shows a cross-section of one example of an electronic device with an ultrasonic transducer. The illustration is only exemplary, wherein the proportions of the drawing are not essential for fully executing the functionality of the device. A body 200 is made of a material that allows ultrasonic waves and other sound waves to travel through the body 200. The material may be for example glass, plastic or metal, such as stainless steel or aluminum. The body may be partially covered with a housing 201, for example the middle of the electronic device comprises the body 200 that has a housing 201 surrounding the edges and backside of the electronic device. The housing 201 may be integrated into the body 200 and it may be made of the same material as the body 200.

A first transducer 210 is connected to the body 200, in this example inside the housing 201. The first transducer 210 is configured to produce a first ultrasonic wave 220 into a volume of airspace in proximity to the electronic device. The first transducer 210 is for example a piezoelectric transducer. A transducer is a device that converts a signal in one form of energy to another form of energy or, as in this example, the first transducer 210 converts an electric signal into vibrations. The housing 201 comprises a first opening 202 to allow the first wave 220 to travel out from the housing and into the airspace. The body 200 and the housing 201 form a space 203 around the first transducer 210 that improves the production of the first wave, wherein the space 203 forms a resonant cavity for the acoustic wave. In an embodiment, the electronic device comprises a housing 201 forming a cavity 203 over the body 201, wherein the first transducer 210 is positioned inside the cavity 203, and the housing 201 comprises a first opening 202 configured to deliver the first wave 220 from the cavity 203 into a volume of airspace in proximity to the electronic device.

In an embodiment, the electronic device comprises a speaker 204, wherein the first opening 202 is configured to deliver sound waves from the speaker 204 into a volume of airspace in proximity to the electronic device. The opening 202 may be used for the speaker sound as well as the ultrasonic waves. The speaker 204 and the first transducer 210 may send sound waves at the same time or the speaker 204 may be silenced in order to send the ultrasonic waves from the first transducer 210. In an embodiment, the speaker 204 is used to produce the first wave 220. The first wave 220 diffracts from the opening 202 according to the Huygens-Fresnel principle, wherein the opening 202 may be used as a starting point of the first wave 220 in the volume of airspace in proximity to the electronic device.

In an embodiment, the first wave 220 is an ultrasonic wave. The first wave 220 is transmitted as an oscillating sound pressure wave, wherein the frequency is over the audible range of the human ear, for example more than 20 kHz. The first wave may be transmitted as a burst, wherein the first wave 220 is followed by a pause. One burst may comprise a single sound wave. The first wave 200 exits from the opening 202 radially to the surrounding airspace. In this example, the first wave 220 hits an object 221 in proximity to the electronic device and reflects back to a first receiving transducer 222. The object 221 may be a finger or hand of the user. The first receiving transducer 222 is configured to receive the first wave; the receiving transducer may be a microphone suitable for receiving ultrasonic waves, or a piezoelectric microphone. The first receiving transducer may receive the first wave from two sources: directly from the opening 202 and as a reflection from the object 221.

A proximity sensing element 230 is configured to detect proximity of an object from an echoed or reflected first wave 220. The information of the first ultrasonic wave 220 travelled directly from the opening 202 may be used to analyze the proximity of the object 221 together with the echoed or reflected first wave 220. The object proximity may be calculated in relation to the opening 202 and the reflected first wave 220 received by the first receiving transducer 222. The electronic device may comprise multiple first receiving transducers; for example in FIG. 2 another first receiving transducer 223 is illustrated. The difference between the reflected ultrasonic waves received by multiple first receiving transducers 222, 223 may be used to detect movement of the object 221, direction of the movement or shape of the object 221. The proximity sensing element 230 is electrically connected to the first transducer 210 and at least to the first receiving transducer 222. The proximity sensing element 230 comprises a processor and a memory storing instructions that, when executed, control the operation of the proximity sensing element 230. The proximity sensing element 230 may be a discrete element in the electronic device, or the functionalities may be integrated to other processor elements of the electronic device.

Figure 3:
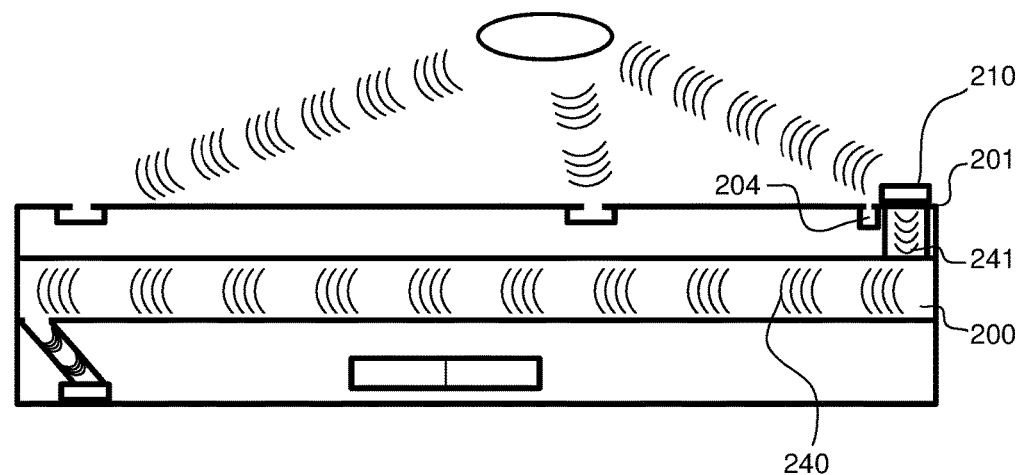
FIG. 3 is a schematic cross-section of one example of an electronic device with an ultrasonic transducer, wherein a transducer is positioned outside a housing or body.

The first transducer 210 is configured to produce a second ultrasonic wave 240 to the body 200. A connection between the first transducer 210 and the body 200 is configured to deliver the second wave 240 to the body 200. The connection may be a direct mounting to the body 200; the transducer 210 may be glued or screwed to the body 200. As illustrated in FIG. 3, the first transducer 210 may be configured to a portion of the housing 201, wherein the connection 241 between the housing 201 and the body is configured to pass the second wave 240 to the body 200. The first transducer 210 may be positioned inside the body 200, inside the housing 201 or on top of the housing 201 or body 200.

Referring to FIG. 2, a second receiving transducer 241 is configured to receive the second wave 240 from the body 200. In an embodiment, the first transducer 210 is configured to produce the first wave 220 and the second wave 240 simultaneously. The vibration produced by the first transducer 210 travels in bursts through the body 200 and the airspace simultaneously. A touch sensing element 250 is configured to detect a touch by analyzing the second wave 240 received by the second receiving transducer 241. The touch sensing element 250 is electrically connected to the first transducer 210 and at least to the second receiving transducer 241. The touch sensing element 250 comprises a processor and a memory storing instructions that, when executed, control the operation of the touch sensing element 250. The touch sensing element 250 may be a discrete element in the electronic device, integrated to the proximity sensing element 230, or the functionalities may be integrated to other processor elements of the electronic device.

FIG. 4 shows an embodiment, wherein the electronic device comprises multiple touch sensitive areas 401, 402, 403 that are connected to at least one second receiving transducer, such as the second receiving transducer 241 of FIG. 2. The electronic device may comprise more touch sensitive areas or second receiving transducers on other sides of the electronic device. The second receiving transducers are connected to the body 200, for example to a portion of the body 200, wherein the shape of the body 200 is at least partially isolated from other second receiving transducers. The isolation may be for example a protrusion formed to the body 200 that protrudes through the housing 201, allowing the user to touch it. In this example the protrusion formed to the body 200 is illustrated as touch sensitive areas 401, 402, 403. The shape may be a groove around the second receiving transducer that isolates the ultrasonic characteristics to be mixed when touching other portions of the body 200. The shape may be configured inside the housing, wherein it is not visible to the user. The second receiving transducer 241 and the touch sensing element 250 are configured to sense the touch by analyzing the decay or the change in the vibration characteristics of the second wave 240 received from the body 240.

FIG. 5 shows an example of a graph illustrating the ultrasonic wave energy from the second receiving transducer as a function of time. When the user touches the body of the electronic device, the decay of the ultrasonic wave changes. As in a musical instrument, for example in a guitar string, the string vibrates freely unless the player dampens the string. When the user touches the body in an area near the second receiving transducer, the vibration dampens faster. Graph 501 illustrates the decay of the second wave when the user is not touching the body and graph 502 illustrates the decay of the second wave when the user touches the body.

The difference 510 highlights the change in the decay, allowing the touch sensing element to detect that a portion of the body is touched.

The vibration characteristics may also change as a response to touch. For example the characteristic frequency of the vibration relating at least to a portion of the body 200 may change, resembling the effect of a musical instrument. The body 200 may be shaped to comprise different portions that have different resonant frequencies, thereby allowing the separation of the touch for different portions of the body. This enables multiple touch sensitive areas that may be assigned to different functions as illustrated in FIG. 4. The first transducer 210 may transmit different frequencies to enable the detection of touch from second receiving transducers for different portions of the body 200.

Figure 7:
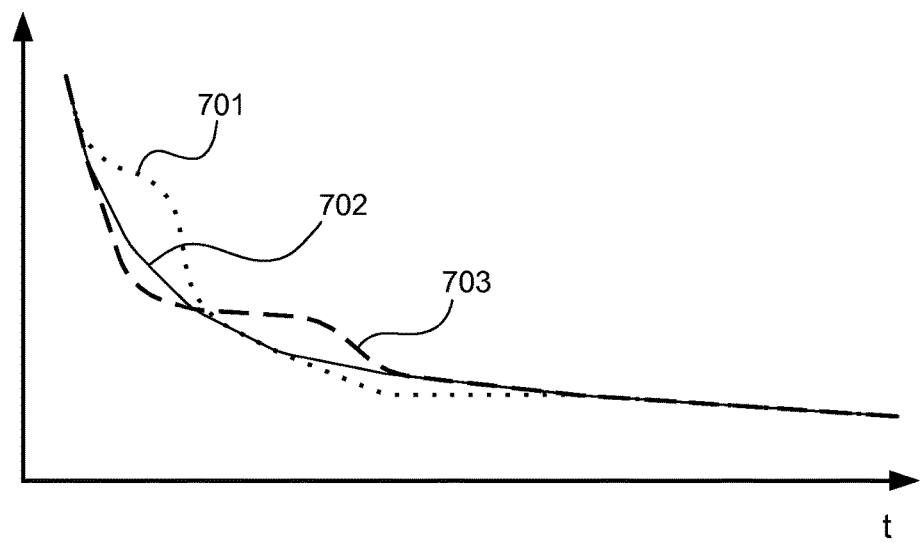
FIG. 7 is an example of a graph illustrating the received signal amplitude from a receiving transducer as a function of time.

FIG. 7 shows an example of the received signal amplitude from the receiving transducer as a function of time. Graph 702 illustrates the amplitude when the touch sensitive area of the electronic device is not touched. Graph 701 illustrates the amplitude response of the electronic device when a first touch sensitive area of the body is touched. The amplitude curve remains at a higher level for a longer period, but soon drops below the compared graph 702. Graph 703 illustrates the amplitude response of the electronic device, when a second touch sensitive area of the body is touched. The amplitude initially dampens faster, but remains at a higher level for a longer period than graph 701 or graph 702. Different protrusions or shapes at the body may result in different amplitude responses.

Figure 6:
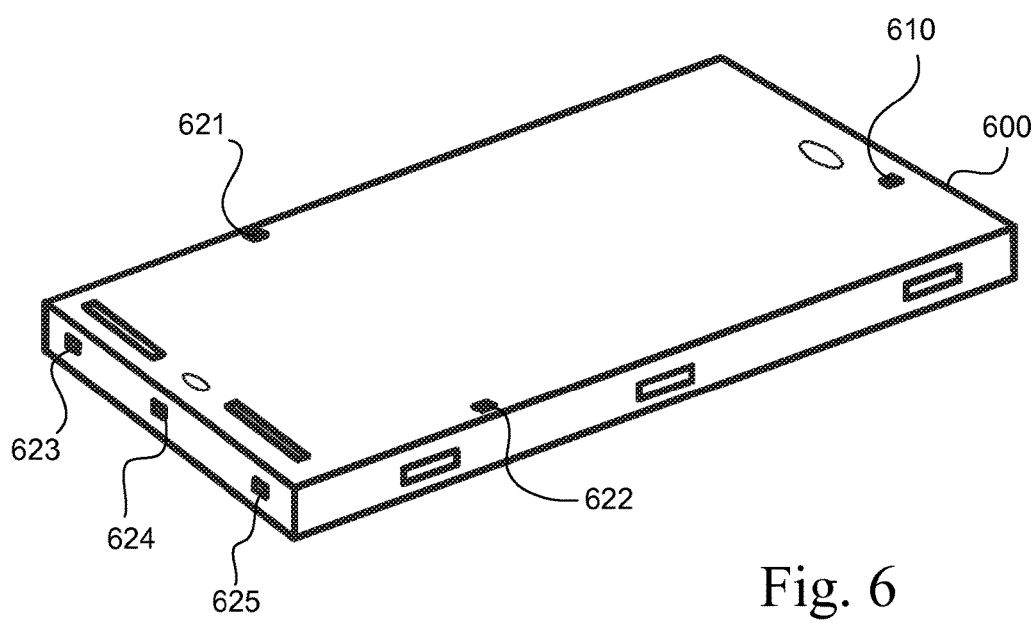
FIG. 6 is an example of the electronic device comprising multiple receiving transducers.

FIG. 6 shows an embodiment of the electronic device comprising multiple first receiving transducers 621, 622, 623, 624, 625. The first transducer 610 is in this example positioned on top of the body and housing 600. The first receiving transducers 621, 622, 623, 624, 625 may be positioned over or inside the housing 600, wherein the ultrasonic waves travel to the receiving transducers through an opening. Multiple first receiving transducers 621, 622, 623, 624, 625 configured on different sides of the housing 600 allow more accurate positioning of the object in the airspace around the electronic device. The increasing number of first receiving transducers 621, 622, 623, 624, 625 may allow detecting different reflections of the ultrasonic wave, thereby increasing the resolution of detecting the object, the gesture of the object or the shape of the object. Multiple first receiving transducers 621, 622, 623, 624, 625 allow receiving the reflections from different sides of the electronic device.

An embodiment discloses an electronic device, comprising: a body; a first transducer connected to the body and configured to produce a first wave into a volume of airspace in proximity to the electronic device; a first receiving transducer configured to receive the first wave; a proximity sensing element configured to detect proximity of an object from an echoed first wave; the first transducer configured to produce a second wave, wherein a connection between the first transducer and the body is configured to deliver the second wave to the body; a second receiving transducer configured to receive the second wave from the body; and a touch sensing element configured to detect a touch by analyzing the second wave received by the second receiving transducer. In an embodiment of the electronic device, the first transducer is configured to produce the first wave and the second wave simultaneously. An embodiment discloses an electronic device, comprising: a body; a first transducer connected to the body and configured to produce a first wave into a volume of airspace in proximity to the electronic device; means for receiving the first wave; means for detecting proximity of an object from an echoed first wave; the first transducer configured to produce a second wave, wherein a connection between the first transducer and the body is configured to deliver the second wave to the body; means for receiving the second wave from the body; and means for detecting a touch by analyzing the second wave received by the second receiving transducer. In an embodiment of the electronic device, the first transducer is configured to produce the first wave and the second wave simultaneously. In an embodiment of the electronic device, the first transducer is a piezoelectric transducer. In an embodiment of the electronic device, the first wave is an ultrasonic wave. In an embodiment, the electronic device comprises at least two second receiving transducers configured to receive the second wave from the body. In an embodiment of the electronic device, the touch sensing element is configured to sense the touch by analyzing the decay of the second wave received from the body. In an embodiment, the electronic device comprises a housing forming a cavity over the body, wherein the first transducer is positioned inside the cavity, and the housing comprises a first opening configured to deliver the first wave from the cavity into the volume of airspace in proximity to the electronic device. In an embodiment, the electronic device comprises a speaker, wherein the first opening is configured to deliver sound waves from the speaker into the volume of airspace in proximity to the electronic device.

An embodiment discloses a system, comprising: a body; a first transducer connected to the body and configured to produce a first wave into a volume of airspace in proximity to the body; a first receiving transducer configured to receive the first wave; a proximity sensing element configured to detect proximity of an object from an echoed first wave; the first transducer configured to produce a second wave, wherein a connection between the first transducer and the body is configured to deliver the second wave to the body; a second receiving transducer configured to receive the second wave from the body; and a touch sensing element configured to detect a touch by analyzing the second wave received by the second receiving transducer. An embodiment discloses a system, comprising: a body; a first transducer connected to the body and configured to produce a first wave into a volume of airspace in proximity to the electronic device; means for receiving the first wave; means for detecting proximity of an object from an echoed first wave; the first transducer configured to produce a second wave, wherein a connection between the first transducer and the body is configured to deliver the second wave to the body; means for receiving the second wave from the body; and means for detecting a touch by analyzing the second wave received by the second receiving transducer. In an embodiment of the system, the first transducer is configured to produce the first wave and the second wave simultaneously. In an embodiment of the system, the first transducer is a piezoelectric transducer. In an embodiment of the system, the first wave is an ultrasonic wave. In an embodiment, the system comprises at least two second receiving transducers configured to receive the second wave from the body. In an embodiment of the system, the touch sensing element is configured to sense the touch by analyzing the decay of the second wave received from the body. In an embodiment, the system comprises a housing forming a cavity over the body, wherein the first transducer is positioned inside the cavity, and the housing comprises a first opening configured to deliver the first wave from the cavity into the volume of airspace in proximity to the body. In an embodiment, the system comprises a speaker, wherein the first opening is configured to deliver sound waves from the speaker into the volume of airspace in proximity to the electronic device.

An embodiment discloses a method of providing user inputs to an electronic device, the method comprising: producing a first wave into a volume of airspace in proximity to the electronic device by a first transducer connected to a body of the electronic device; receiving the first wave by a first receiving transducer; detecting proximity of an object from an echoed first wave by a proximity sensing element; producing a second wave by the first transducer and delivering the second wave to the body through a connection between the first transducer and the body; receiving the second wave from the body by a second receiving transducer configured for: detecting a touch by analyzing the second wave received by the second receiving transducer on a touch sensing element. An embodiment discloses a method of providing user inputs to an electronic device, the method comprising: producing a first wave into a volume of airspace in proximity to the electronic device by a first transducer connected to a body of the electronic device; receiving the first wave by a first receiving means; detecting proximity of an object from an echoed first wave; producing a second wave by the first transducer and delivering the second wave to the body through a connection between the first transducer and the body; and receiving the second wave from the body by a second receiving means. In an embodiment, the method comprises producing the first wave and the second wave simultaneously. In an embodiment, the method comprises analyzing the decay of the second wave received from the body to detect the touch. In an embodiment, the first wave is an ultrasonic wave.

An embodiment discloses an electronic device, comprising a body; a first transducer connected to the body and configured to produce a wave into a volume of airspace in proximity to the electronic device and into the body; a first receiving transducer configured to receive an echoed wave based on the wave into the volume of airspace; a proximity sensing element configured to detect proximity of an object by analyzing the echoed wave received by the first receiving transducer; a second receiving transducer configured to receive the wave into the body; and a touch sensing element configured to detect a touch by analyzing the wave received by the second receiving transducer.

The first transducer may be used to transmit ultrasonic waves to air and to the body, thereby reducing the number of components to transmit the waves. As the components are shared, a more cost efficient implementation is achieved. Proximity sensors may be used with the ultrasonic proximity sensors and capacitive touch sensing technologies may be used with the ultrasonic touch sensing as the ultrasound may not limit the use of other sensing functions. Gestures may be used to control functions of the electronic device. When the electronic device detects that the user is touching the device, the proximity detection or proximity detection may be turned off to save power.

Alternatively, or in addition, the functionality described herein can be performed, at least in part, by one or more hardware components or hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the touch sensing element functionality or proximity sensing element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device, it will be appreciated that the storage may be distributed or located remotely and accessed via a network or other communication link, for example by using a communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user such as by receiving information about bone lengths of the user. In an embodiment, the display device may also act as the user input device if it is a touch sensitive display device. The input/output controller may also output data to devices other than the display device, e.g. a locally connected printing device.

The term "computer" or "computing-based device" is used herein to refer to any device with such processing capability that it can execute instructions. Those skilled in the art will realize that such processing capabilities are incorporated into many different devices and therefore the terms "computer" and "computing-based device" each include PCs, servers, mobile telephones (including smart phones), tablet computers, set-top boxes, media players, games consoles, personal digital assistants and many other devices.

The methods described herein may be performed by software in machine readable form on a tangible storage medium, e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not only include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to "an" item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term "comprising" is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electronic device, comprising:
a body;
a housing forming a cavity over the body and comprising a first opening;
a first transducer connected to the body and configured to produce a first wave into a volume of airspace in proximity to the electronic device, wherein the first transducer is positioned inside the cavity and delivers the first wave from the cavity into the volume of airspace;
a first receiving transducer configured to receive the first wave;
a proximity sensing element configured to detect proximity of an object from an echoed first wave;
the first transducer configured to produce a second wave, wherein a connection between the first transducer and the body is configured to deliver the second wave to the body;
a second receiving transducer configured to receive the second wave from the body; and
a touch sensing element configured to detect a touch by analyzing the second wave received by the second receiving transducer.

2. The electronic device according to claim 1, wherein the first transducer is configured to produce the first wave and the second wave simultaneously.

3. The electronic device according to claim 1, wherein the first transducer is a piezoelectric transducer.

4. The electronic device according to claim 1, wherein the first wave is an ultrasonic wave.

5. The electronic device according to claim 1, further comprising:
at least two second receiving transducers configured to receive the second wave from the body.

6. The electronic device according to claim 1, wherein the touch sensing element is configured to sense the touch by analyzing the decay of the second wave received from the body.

7. The electronic device according to claim 1, wherein the body is configured to comprise one or more different portions having one or more different resonant frequencies to provide separation of the touch for the one or more different portions of the body.

8. The electronic device according to claim 1, further comprising:
a speaker, wherein the first opening is configured to deliver sound waves from the speaker into the volume of airspace in proximity to the electronic device.

9. A system, comprising:
a body;
a housing forming a cavity over the body and comprising a first opening;
a first transducer connected to the body and configured to produce a first wave into a volume of airspace in proximity to the body, wherein the first transducer is positioned inside the cavity and delivers the first wave from the cavity into the volume of airspace;
a first receiving transducer configured to receive the first wave;
a proximity sensing element configured to detect proximity of an object from an echoed first wave;
the first transducer configured to produce a second wave, wherein a connection between the first transducer and the body is configured to deliver the second wave to the body;
a second receiving transducer configured to receive the second wave from the body; and
a touch sensing element configured to detect a touch by analyzing the second wave received by the second receiving transducer.

10. The system according to claim 9, wherein the first transducer is configured to produce the first wave and the second wave simultaneously.

11. The system according to claim 9, wherein the first transducer is a piezoelectric transducer.

12. The system according to claim 9, wherein the first wave is an ultrasonic wave.

13. The system according to claim 9, comprising at least two second receiving transducers configured to receive the second wave from the body.

14. The system according to claim 9, wherein the touch sensing element is configured to sense the touch by analyzing the decay of the second wave received from the body.

15. The system according to claim 9, wherein the body is configured to comprise one or more different portions having one or more different resonant frequencies to provide separation of the touch for the one or more different portions of the body, and wherein the one or one or more different portions are assigned one or more different functions.

16. The system according to claim 9, further comprising:
a speaker, wherein the first opening is configured to deliver sound waves from the speaker into the volume of airspace in proximity to the electronic device.

17. A method of providing user inputs to an electronic device, the method comprising:
producing a first wave into a volume of airspace in proximity to the electronic device by a first transducer connected to a body of the electronic device, wherein a housing forms a cavity over the body and comprises a first opening, and wherein the first transducer is positioned inside the cavity and produces the first wave from the cavity into the volume of airspace;
receiving the first wave by a first receiving transducer;
detecting proximity of an object from an echoed first wave by a proximity sensing element;
producing a second wave by the first transducer and delivering the second wave to the body through a connection between the first transducer and the body; and
receiving the second wave from the body by a second receiving transducer configured for detecting a touch by analyzing the second wave received by the second receiving transducer on a touch sensing element.

18. A method according to claim 17, comprising producing the first wave and the second wave simultaneously.

19. A method according to claim 17, comprising analyzing the decay of the second wave received from the body to detect the touch.

20. An electronic device, comprising:
a body;
a housing forming a cavity over the body and comprising a first opening;
a first transducer connected to the body and configured to produce a wave into a volume of airspace in proximity to the electronic device and into the body, wherein the first transducer is positioned inside the cavity and delivers the first wave from the cavity into the volume of airspace;
a first receiving transducer configured to receive an echoed wave based on the wave into the volume of airspace;
a proximity sensing element configured to detect proximity of an object by analyzing the echoed wave received by the first receiving transducer;
a second receiving transducer configured to receive the wave into the body; and
a touch sensing element configured to detect a touch by analyzing the wave received by the second receiving transducer.

* * * * *